United States Patent [19]

Fujii et al.

[11] Patent Number: 5,053,973
[45] Date of Patent: Oct. 1, 1991

[54] METHOD AND APPARATUS FOR CORRECTING DEFLECTION OF A MOVABLE MEMBER

[75] Inventors: Shigeharu Fujii, Numazu; Akira Ochiai, Susono; Akio Fujii, Mishima, all of Japan

[73] Assignee: Toshiba Machine Co., Ltd., Tokyo, Japan

[21] Appl. No.: 383,527

[22] Filed: Jul. 24, 1989

[30] Foreign Application Priority Data

Jul. 26, 1988 [JP] Japan .................................. 63-186273

[51] Int. Cl.$^5$ .................................. G06F 15/46
[52] U.S. Cl. .................... 364/474.17; 364/474.35; 364/474.31
[58] Field of Search ............. 364/474.17, 474.16, 364/474.34, 474.35, 474.37, 474.18, 167.01, 176, 476, 571.01–571.08, 551.02, 474.28, 474.31

[56] References Cited

U.S. PATENT DOCUMENTS

| | | | |
|---|---|---|---|
| 3,555,254 | 1/1971 | Gerber | 364/474.35 |
| 4,471,443 | 9/1984 | Kinoshita et al. | 364/474.35 |
| 4,502,108 | 2/1985 | Nozawa et al. | 364/474.35 |
| 4,514,813 | 4/1985 | Nozawa et al. | 364/474.35 |
| 4,587,622 | 5/1986 | Herzog | 364/474.37 |
| 4,775,926 | 10/1988 | Hasesawa et al. | 364/474.35 |
| 4,819,195 | 4/1989 | Bell et al. | 364/474.35 |
| 4,939,678 | 7/1990 | Beckwith, Jr. | 364/474.37 |

*Primary Examiner*—Jerry Smith
*Assistant Examiner*—Jim Trammel
*Attorney, Agent, or Firm*—Oblon, Spivak, McClelland, Maier & Neustadt

[57] ABSTRACT

In an apparatus for correcting deflection produced in a construction due to the weight of the construction or movement of a movable member supported by the construction, a condition data representing the deflection associated with the moved position of the movable member is stored in a memory section of a correction controller. The movement of the movable member is detected by a position detector and a position signal is generated from the position detector. A command signal is supplied to a calculator and the position signal is received in the calculator synchronized with the command signal. The condition data is accessed by the calculator with the received position signal and is processed into a correction data. A correction data is supplied to a proportional control electromagnetic valve and a hydraulic cylinder for applying a force onto the construction is regulated by the valve to correct the deflection of the construction.

6 Claims, 5 Drawing Sheets

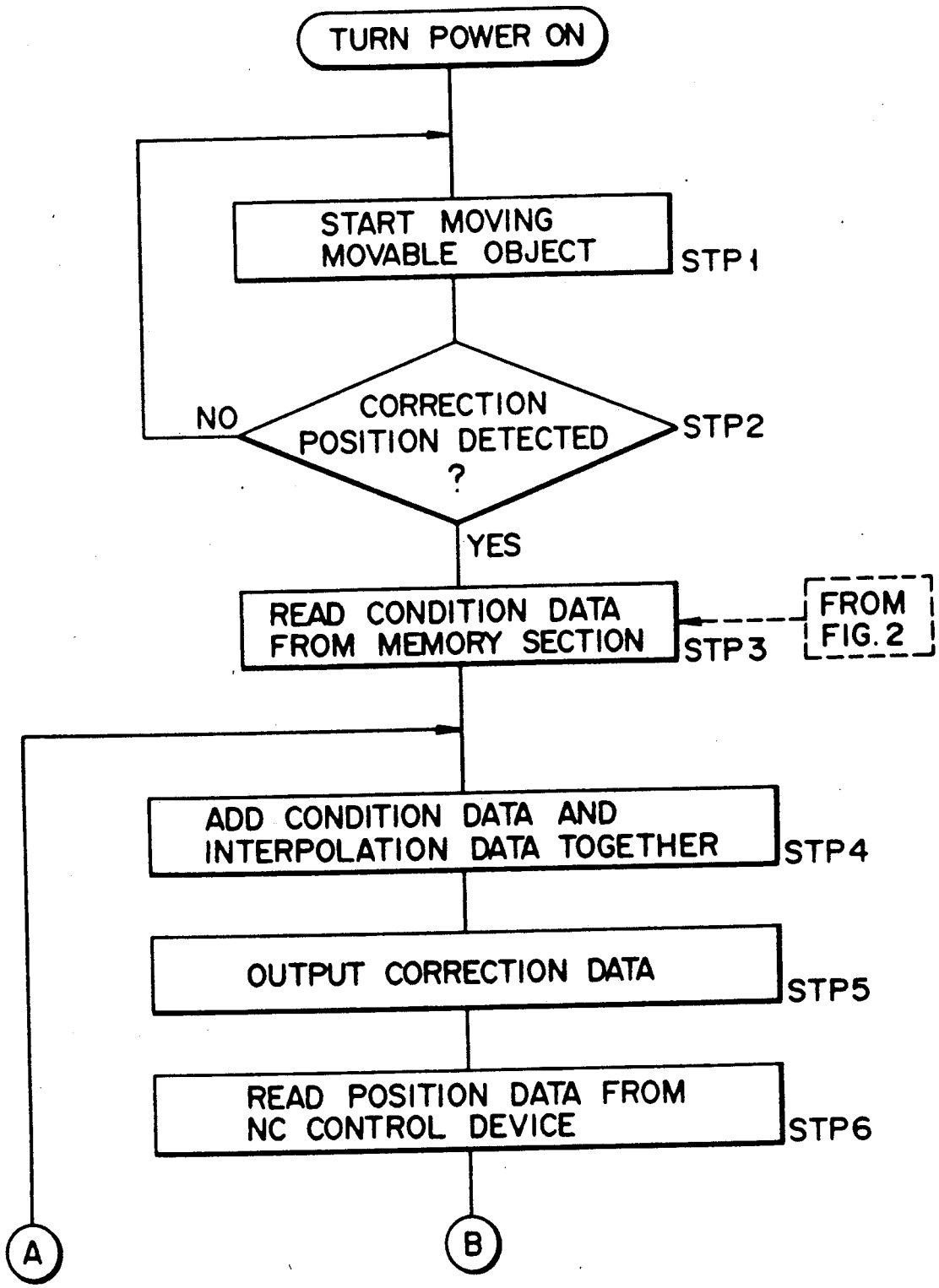
F I G. 3A

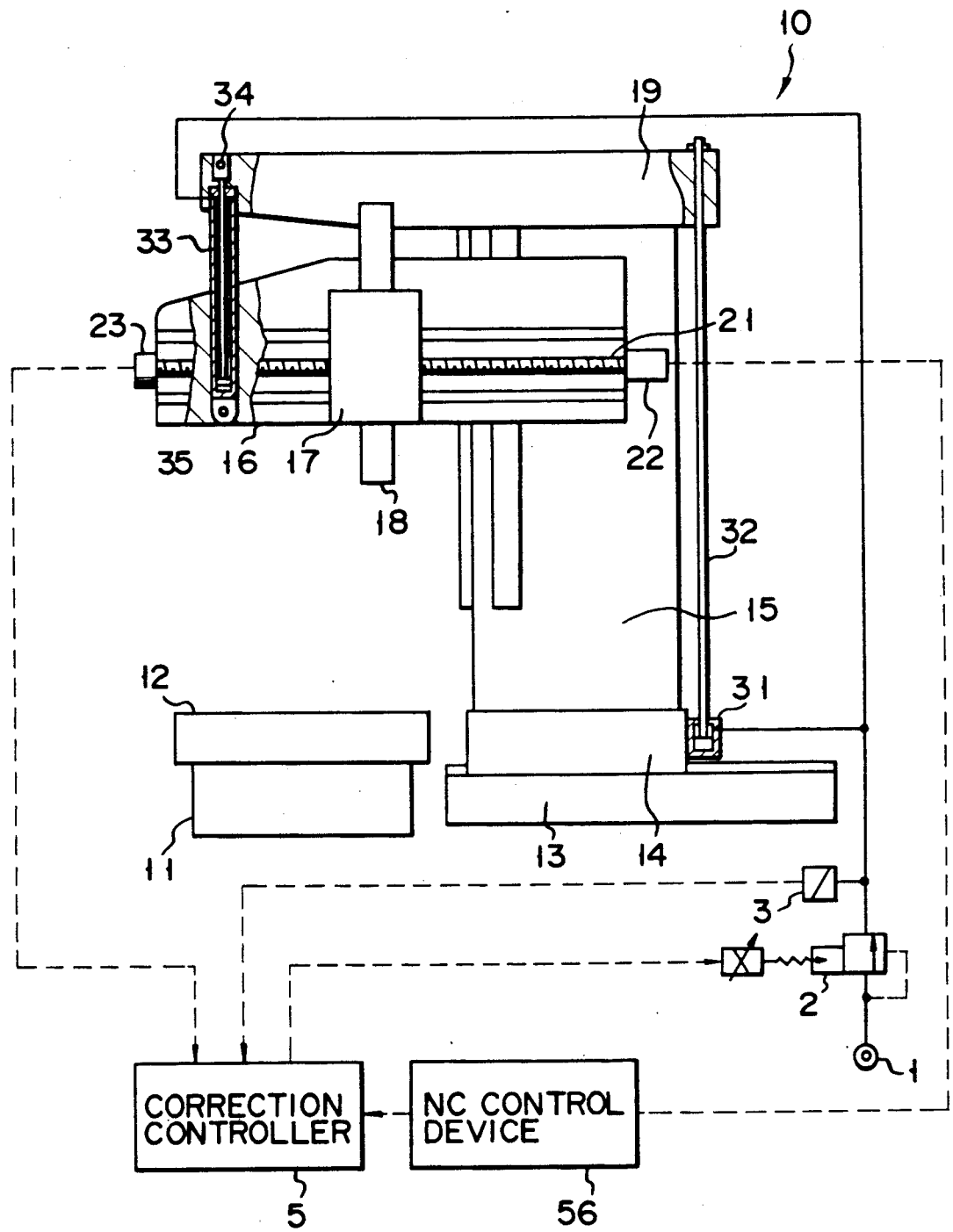
F I G. 4

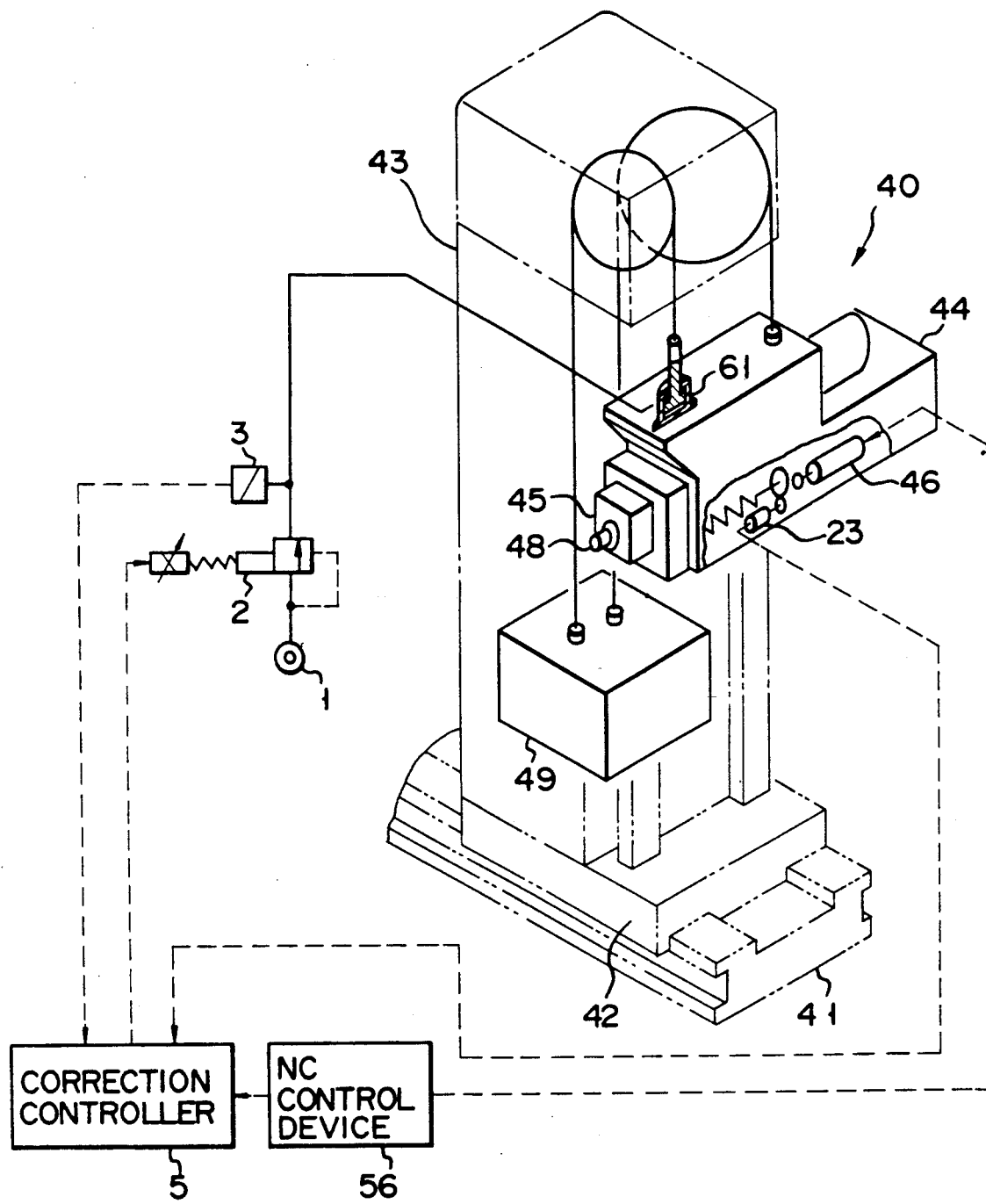
F I G. 5

METHOD AND APPARATUS FOR CORRECTING DEFLECTION OF A MOVABLE MEMBER

BACKGROUND OF THE INVENTION

1. Field of the Invention

The present invention relates to a machine tool system, and more particularly to a method and apparatus for correcting deflection which the construction of the machine tool system may undergo due to the motion of a movable member of the machine tool system.

2. Description of the Related Art

A construction used with a large-sized machine tool system is inevitably long and very heavy. Therefore, it may undergo deflection, due to its own weight or due to the motion of the movable member of the machine tool system. If the construction of the machine tool system undergoes deflection, the working point on an object to be machined may be dislocated, lowering the machining accuracy.

According to one conventional correction method, this problem is solved by providing the sliding surfaces of the construction with correcting characteristics which are opposite to the deflection characteristics of the construction. However, a high-level technique is required in actually working the sliding surfaces to provide such correcting characteristics. In addition, the correction based on this method is not always reliable, since the correcting characteristics may include an error as a result of a change in the ambient temperature and since correction beyond the range of the correcting characteristics may be required in some cases.

Published Unexamined Japanese Patent Application No. 49-56274 discloses another correction method. According to this correction method, a hydraulic cylinder is arranged between an auxiliary beam and a cross beam of a machine tool system. If the cross beam, to which a tool rest is coupled, is deflected, this deflection is related to a position of the tool rest. On the basis of a signal output from a position detector for detecting the position of the tool rest, the pressure in the hydraulic cylinder is regulated such that the deflection of the cross beam is corrected. With respect to the method, it should be noted that the pressure in the hydraulic cylinder is regulated by use of a pressure-reducing valve operating on the basis of the signal output from the position detector. Therefore, the deflection which can be corrected by use of the method is limited to a linear one. In addition, satisfactory correction is impossible if the deflection of the cross beam exceeds a predetermined range of correction.

Published Unexamined Japanese Patent Application No. 56-33243 discloses still another correction method. According to this correction method, a hydraulic cylinder is arranged on both sides of the construction of a machine tool system. If the cross beam by means of which a tool rest is supported, is deflected, this deflection is applied to a cam plate. This cam plate is adapted to regulate the pressures in the two hydraulic cylinders in a manner to correct the deflection of the construction. With respect to the method, it should be noted that the correcting characteristics are constant due to the use of the cam plate. Therefore, if a change in the ambient temperature varies the relationships between the degree of deflection and the predetermined correction range, then correction cannot be performed.

SUMMARY OF THE INVENTION

Accordingly, an object of the present invention is to provide a method and apparatus for correcting deflection of a construction which supports the movable member of a machine tool system.

According to the invention,, there is provided a method for correcting deflection produced in a construction of a machine tool system due to the weight of the construction or a movement of a movable member supported by the construction, the method comprising the steps of:

storing a condition data representing the deflection of the construction associated with the moved positions of the movable member;

detecting the moved positions of the movable member to generate a position signal:

accessing the condition data corresponding to the respective positions of the movable member with the position signal and to process the condition data to generate a correction signal; and correcting the deflection of the construction in accordance with the correction data.

According to the invention, there is also provided an apparatus for correcting produced in a construction of a machine tool due to the weight of the construction or motion of a movable member supported by the construction, comprising:

means for storing a condition data representing the of the construction associated with the position of the movable member;

means for detecting the moved positions of the movable member to generate a position signal;

means for accessing the condition data corresponding to the positions of the movable member with the position signal and processing the condition data to generate a correction data; and means for correcting the deflection of the construction in accordance with the correction data.

In the method and apparatus of the invention, the condition data which represents the deflection of the construction for supporting the movable member can be easily changed.

Thus, the deflection produced in the construction can be corrected in various conditions, even if the the ambient condition of the construction is changed or the weight of a member attached to the construction is changed. Further, according to the invention, interpolation data corresponding to the intermediate position between the two detected positions can be calculated to correct the correction, data. Moreover, since the correction of the deflection is performed on the basis of the minimum unit of the correction data, the correction performed smoothly, resulting in improvement of the working accuracy.

BRIEF DESCRIPTION OF THE DRAWINGS

FIGS. 3A and 3B are flow chart showing the process of the calculation performed by the correction controller;

FIG. 4 is a perspective view of a vertical lathe incorporating the displacement/deformation correcting apparatus according to the embodiment; and FIG. 5 is a perspective view of a horizontal boring machine incorporating the deflection correcting apparatus according to the embodiment.

DETAILED DESCRIPTION OF THE PREFERRED EMBODIMENTS

An embodiment of the present invention may now be described, with reference to the accompanying drawings.

Figure 1:
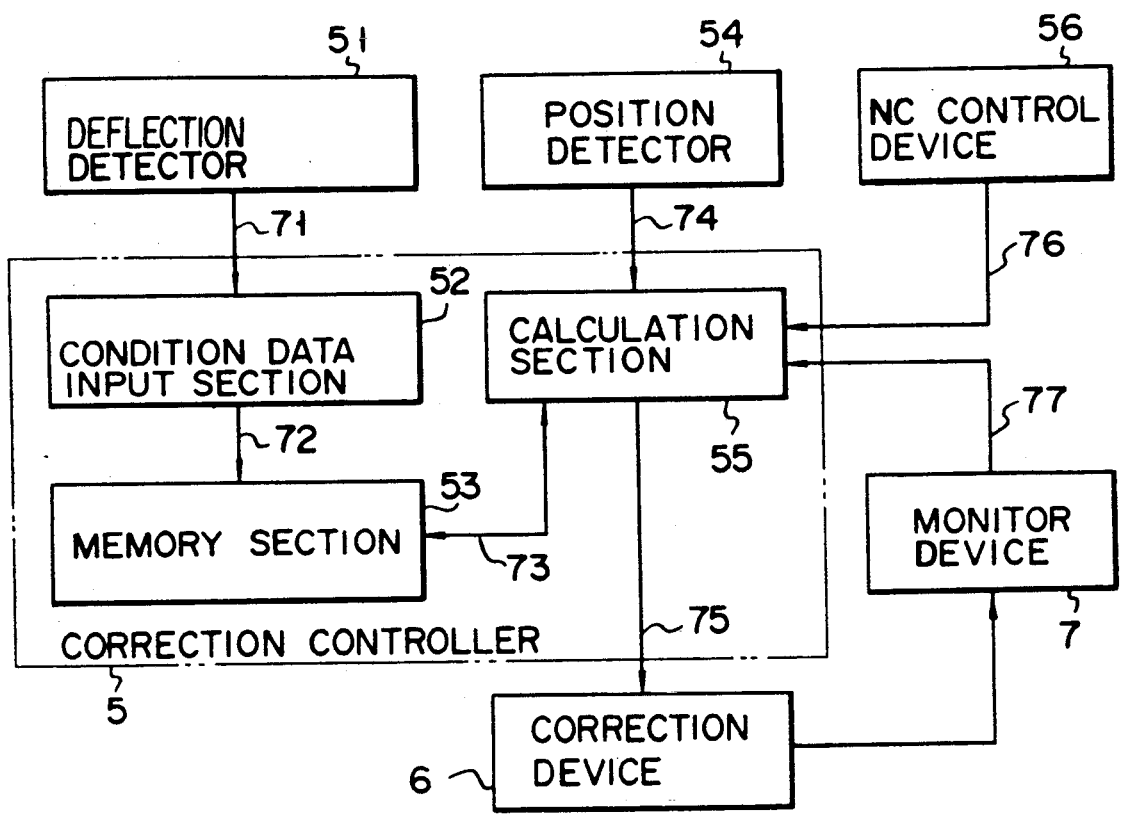
FIG. 1 is a block diagram illustrating a deflection correcting apparatus according to one embodiment of the present invention.

FIG. 1 is a block diagram illustrating a deflection correcting apparatus according to one embodiment of the present invention. The apparatus shown in FIG. 1 comprises a correction controller 5 for generating a correction signal 75, deflection detector 51, for example, electric micrometer, for detecting a deflection produced·in a machine tool system to generate a deflection signal, position detector 54 for detecting a movable member, i.e., a tool rest to generate a position signal 74 (position data), NC control device 56 for controlling the movable member, and monitor device 7 for monitoring the machine tool system. Correction controller 5 also comprises condition data input section 52, i.e., a keyboard for inputting a condition data obtained from detector 51 or A/D converter (not shown) for converting the deflection signal, inputted as a signal 71 from the detector 51 into a digital condition data, memory section 53 for storing the condition data inputted from input section 52, and calculator or processing section 55 for reading the condition data from memory section 53 to calculate correction data. The condition data (signal 71) relates to the position or motion of the movable member of the machine tool system and represents how the construction used with a machine tool system is deflected due to the motion of the movable member of the machine tool system or due to a change in the ambient environment.

In the apparatus, condition data (signal 72) is inputted from input section 52 into memory locations of memory section 53 which is denoted by addresses corresponding to the positions of the movable member. Memory section 53 stores the condition data and calculation section 55 reads the condition data from the memory locations of memory section 53 with the address corresponding to a position signal 74 (position data) which is generated from position detector 54 and is inputted from position detector 54 synchronized with a movement command signal which energizes a moving mechanism (not shown) for moving the movable member and is supplied from NC control device 56 to calculation section 55. Calculation section 55 calculates the distance between one correction position with respect to first position data and the next correction position with respect to second position data, divides the calculated distance, and outputs correction signal 75.

In condition data input section 52, the deflection of the construction is measured by use of deflection detector 51. This detector is constituted by e.g., an electric micrometer which is attached to the movable member and which is moved along the straight edge provided on either the construction or the surface plate. On the basis of the measurement, data is inputted into condition data input section 52, as is indicated by "71" in FIG. 1. If necessary, the correction condition data inputted into section 52 can be easily changed. In the case where the environment under which the machine tool system is placed greatly varies or where the attachment is replaced with another, entirely different in weight, the correction of deflection must be performed in different manners. In such cases, the condition data is changed.

Memory section 53 stores the condition data supplied from condition data input section 52, and outputs that condition data to calculation section 55 in response to addresses 73 supplied from calculation section 55. Since the condition data can be changed in accordance with the need, memory section 53 is required to have the smallest possible capacity. The use of such a memory is advantageous in light of cost.

When position signal 74 (position data) supplied from position detector 54 is detected, calculation section 55 calculates condition data corresponding to the position (position data) of the movable member and supplies correction signal 75 (correction data) to proportional control electromagnetic valve 2 of correction device 6. Calculation section 55 checks the moving direction of the movable member on the basis of movement-commanding signal 76 supplied from NC control device 56 of the machine tool system and calculates the distance between one correction position and the next correction position and the correction signal difference between the two correction positions. When data contained in the movement-commanding signal and expressing a position where a correction should be made corresponds to the positional data (defined by the calculations of calculation section 55), correction data is output from correction controller 5. Further, calculation section 55 calculates the distance between the firstly-detected correction position and the current position on the basis of the moving speed of the movable member. The correction difference signal is processed in accordance with the ratio of the distance between the two correction positions to the distance between the firstly-detected correction position and the current position. If the processed correction difference signal exceeds the minimum, unit of the correction level, an interpolation level is calculated by calculation section 55 and is added to the correction level used at the detected correction position. The calculation of the interpolation level is performed on the basis of the following formula:

$$\delta = l(X2 - X1)/(L2 - L1)$$

where $\delta$ denotes an interpolation level, L1 denotes a detected preceding position (first position), L2 denotes the next detected position (second position), X1 denotes correction condition data to be used at the detected preceding position, X2 denotes correction condition data to be used at the next correction position, and l denotes the distance between the detected preceding position and the current position between the detected preceding and next positions L1, L2.

Therefore, the real correction data X output from the deflection correcting apparatus is given by:

$$X = X1 + \delta$$

Needless to say, detected positions for determining correction condition data, which corresponds to position signals 74, may be located at equal intervals in synchronism with the movement of the movable member; alternatively, they may be located in such a manner that the interval between the adjacent ones is varied in accordance with the movement of the movable member. For instance, the interval between the adjacent correction positions may be shortened with an increase in the moving distance of the movable member, so as to cope with the case where the movable member moves toward the front end portion of the construction.

Results of the above-mentioned calculation performed by calculation section 55 are supplied from correction controller 5 to correction device 6, so as to control proportional control electromagnetic valve 2. In this fashion, the pressure to be produced in the hydraulic cylinder is regulated to correct the deflection of the construction. This pressure regulation is checked by use of monitor device 7, and results of this check are fed back to correction controller 5.

Figure 2:
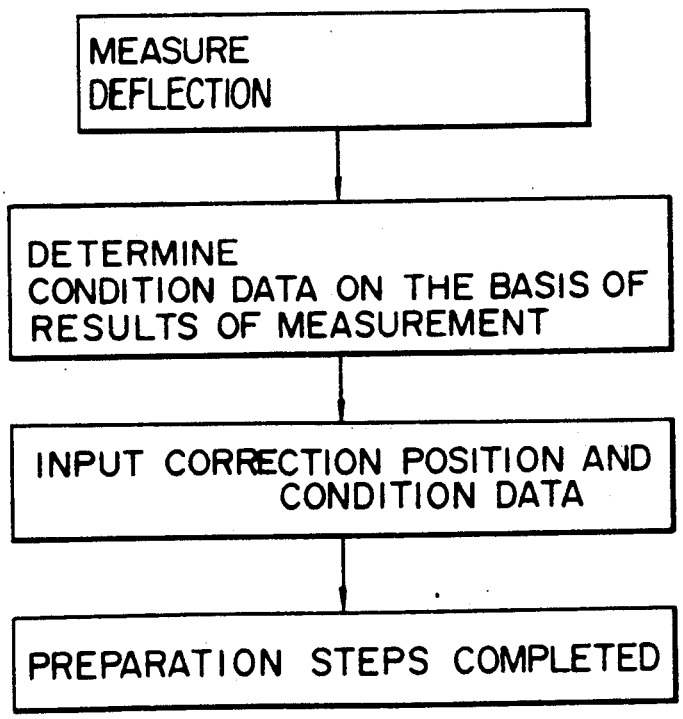
FIG. 2 is a flow chart showing steps for inputting correction condition data into the input section shown in FIG. 1.

FIG. 2 is a flow chart showing the preparation steps executed before the correction position data and the condition data are inputted into correction controller 5. As can be understood from FIG. 2, the deflection of the construction of the machine tool system is measured in relation to the movement of the movable member, and condition data is determined on the basis of the measurement and is inputted to correction controller 5. The inputted correction condition data is stored in memory section 53 of correction controller 5.

Figure 3B:
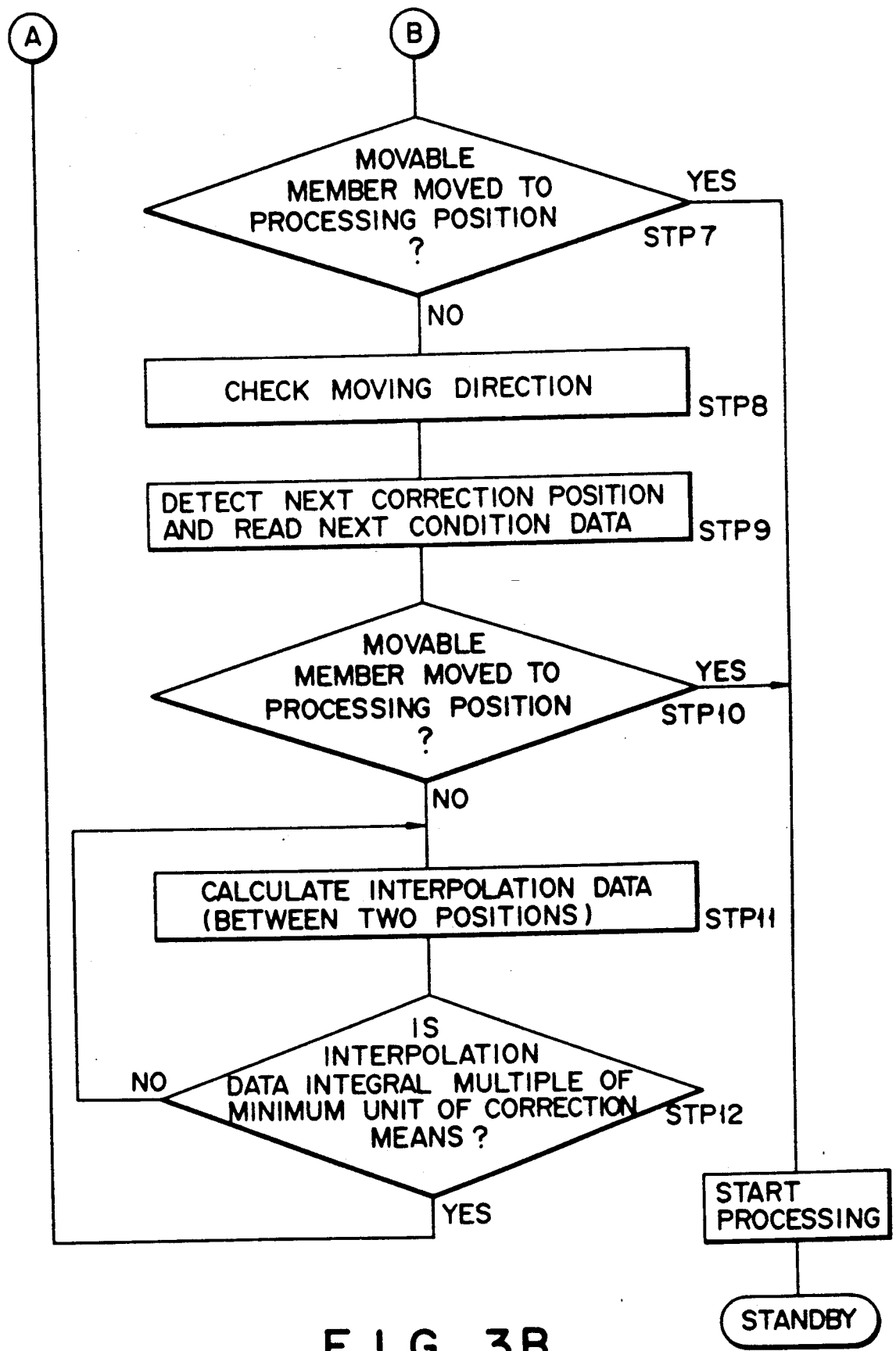

FIGS. 3A and 3B are flow charts showing how a real correction data x is output on the basis of the condition data stored in memory section 53. A description may now be given of each step involved in this process.

When the power source is turned on, the movable member starts moving on the basis of command 76 supplied from NC control device 56 (STP 1). Simultaneously, the position designating the condition data stored in memory section 53 of correction controller 5 is detected by position detector 54 (STP 2). The condition data corresponding to the detected position is read out of memory section 53 and is supplied to calculation section 55 (STP 3). To the condition data, an interpolation data is added (STP 4). The results of this addition are supplied from correction device 6 (STP 5). When the position is detected first time, the interpolation data is 0, so that the condition data is read out of memory section 53 as correction data without being altered. Command 76 output from NC control device 56 is supplied to calculation section 55 (STP 6). When the calculated positional data, e.g., the first calculation data corresponds to the positional data supplied from NC controller, correction data is output from correction controller 5 (STP 7). After the moving direction of the movable member is checked (STP 8) next data on the next detected position following the detected preceding position is supplied to calculation section 55 (STP 9). Whether or not the position data output from NC control device 56 corresponds to the next data read out in STP 9 is checked (STP 10). On the basis of the data supplied to calculation section 55 in STPs 3, 6 and 9, the interpolation data is calculated (STP 11). More specifically, the following calculations are performed in STP 11. First, the condition data corresponding to the detected preceding position is subtracted from the condition data corresponding to the next detected position, thereby obtaining difference (X2−X1). Second, distance l between the detected preceding position and the current detected position of the movable member is calculated on the basis of the clock signal and of the moving speed designated by NC command 76 supplied from the NC control device 56 in STP 6. Finally, difference (X2−X1) is distributed on the basis of the difference between the detected positions designated by the data supplied in STPs 3 and 9, i.e., the ratio of distance (L2−L1) to distance l.

In STP 12, it is checked whether or not the result obtained in STP 11 exceeds the minimum unit of the supplementary correction signal. If the result exceeds the minimum unit, the interpolation, data (δ) is supplied to calculation section 55, and STPs 4 through 11 are executed once again. If the result does not exceed the minimum unit, the movable member is moved until the result exceeds the minimum unit. When the result has exceeded the minimum unit, the interpolation data δ is supplied to calculation section 55.

As a result of the execution of STP 12, the supplementary correction data (δ) and the correction condition data supplied in STP 3 are added together, and a real correction data (X) is supplied from correction controller 5 to correction device 6, as is indicated by "75" in FIG. 1.

A description may now be given of the case where the present invention is applied to a large-sized machine tool system.

FIG. 4 is a perspective view of a vertical lathe 10 incorporating the deflection correcting apparatus of the present invention mentioned above. Referring to FIG. 4, table bed 11 has rotatable table 12 on which a work (i.e., an object to be worked) is mounted. Base 14 for moving column 15 toward the center of table 12 is slidably supported on bed 13. Column 15 is secured to base 14 by means of a bolt. Column 15 is vertically movable with a screw driven by a driving source (not shown). The side face of column 15 is a sliding face on which cross beam 16 is arranged. Tool rest 17 is mounted on cross beam 16. Tool rest 17 is horizontally movable with ball screw 21 driven by motor 22 Rotary encoder 23 for detecting the position of tool rest 17 is disposed at one axial end of screw 21. Vertically-movable tool bar 18 is mounted on tool rest 17, and a tool (i.e., an attachment) for cutting the work mounted on table 12 is provided at the tip end of tool bar 18. Tool bar 18 slides on tool rest 17 by use of a ball screw (not shown). Auxiliary beam 19 is secured to an upper section of column 15 by means of a bolt. The rod of hydraulic cylinder 33 is swingably attached to the tip end of auxiliary beam 19 by means of pin 34. The head of hydraulic cylinder 33 is swingably attached to the tip end portion of cross beam 16 by means of pin 35. The stroke of hydraulic cylinder 33 corresponds to the vertical stroke of cross beam 16.

Hydraulic cylinder 31 is provided between auxiliary beam 19 on the top of column 15 and base 14 by use of connecting shaft 32. Both hydraulic cylinders 31 and 33 can be applied with the same pressure by varying their pressure-receiving areas in accordance with the distortion or twist of cross beam 16. A pressurized oil is supplied from pressurized oil source 1 to both hydraulic cylinders 31 and 33 via proportional control electromagnetic valve 2.

Table 12 has a straight edge (not shown) arranged at a predetermined location thereof. When tool rest 17 is moved, the electric micrometer attached to the tip end of tool bar 18 slides along the straight edge, so that deflection of cross beam 16 can be measured. Condition data based on the measurement is entered to, and stored in correction controller 5. Tool rest 17 starts moving in response to a command supplied from NC control device 56. Position detector 54 detects a position, and condition data corresponding to that correction position is read. This correction condition data is calculated by the calculation section of correction controller 5, and results of this calculation are supplied to the correction device. Therefore, the proportional control electromagnetic valve 2 of the correction device is controlled, whereby the pressures of hydraulic cylinders 31 and 33 are regulated. A monitor device (e.g., a pressure sensor) checks whether the pressures have been correctly regulated, and results of this check are fed back to the calculation section of correction controller 5. When hydraulic cylinders 31 and 33 are applied with the regulated pressures, forces corresponding to the pressures are generated, whereby distortion of cross beam 16 and twist of column 15 are corrected.

FIG. 5 is a perspective view of a horizontal boring machine 40 to which the present invention is applied. In FIG. 5, the same reference numerals as in FIG. 4 denote parts corresponding or similar to those employed in FIG. 4. The horizontal boring machine may undergo displacement or deformation, due to the use of various kinds of attachments (e.g., an angle head) which are difference in weight, or due to the motion of ram 45. As is shown in FIG. 5, column base 42 is slidably arranged on bed 41. Column 43 is secured to column base 42 by means of a bolt. One side face of column 43 is a sliding face, and vertical head 44 is arranged on the sliding face in a manner to be vertically slidable. Ram 45, fitted around main spindle 48 and movable in the axial direction of main spindle 48, is arranged within vertical head 44. Motor 46 for driving ram 45 is attached to the rear portion of vertical head 44. Similarly, rotary encoder 23 for detecting the position of ram 45 by use of a gear train is also attached to the rear portion of vertical head 44.

Balance weight 49 is arranged in the interior of column 43. Balance weight 49 is connected to vertical head 44 by use of two wires which are wound around the pulleys located in the upper region of column 43. Of the two wires, the one closer to the front portion of vertical head 44 is coupled to vertical head 44 by use of hydraulic cylinder 61

When ram 45 is moved, the electric micrometer attached to the tip end of ram 45 slides along the straight edge fixed at a predetermined location of the machine, so that deflection of ram 45 can be measured. Condition data based on the measurement is inputted into correction controller 5 and is stored therein. Next, ram 45 is moved on the basis of a command supplied from NC control device 56, and a correction position is detected by rotary encoder 23. Correction controller 5 performs calculation, and a correction signal based on this calculation is supplied to the correction device. More specifically, proportional control electromagnetic valve 2 of the correction device is controlled on the basis of the correction signal output from correction controller 5, and the pressure in hydraulic cylinder 61 is regulated. As a result, the pressure in hydraulic cylinder 61 is regulated in a manner to correct the deflection of vertical head 44.

What is claimed is:

1. A method for correcting deflections occurring in a supporting member and caused by a movement of a movable member supported by the supporting member, by at least one of the weight of the movable member and changes in loads applied by the movable member, said supporting member and movable member being coupled in a machine tool system, comprising:
    a preparatory step of selecting a plurality of measurement positions in the moving direction of the movable member, at which deflections of the supporting member are to be respectively measured, detecting the deflections corresponding to the measurement positions, obtaining correction values corresponding to the measurement positions, and storing the correction values into memory means;
    a position detecting step of detecting a moved position of the movable member on the supporting member; and
    a correcting step of correcting the deflection of the supporting member, by activating a cylinder, based on the correction values stored in the memory means, when the moved position of the movable member corresponds to one of the measurement positions, and based on an interpolation value, when the moved position of the movable member is between adjacent two of the measurement positions, said interpolation value being determined from a distance between the moved position of the movable member and one of the adjacent two measurement positions which is farther away from an end of the supporting member than the other, and from a difference between two of the correction values corresponding to the two adjacent measurement positions, and being an integral multiple of a minimum pressure unit equal to a smallest controllable pressure of the cylinder.

2. A method according to claim 1, wherein the moved position of the movable member is represented by numerical data.

3. A method according to claim 1, wherein the moved position is represented by a clock pulse.

4. An apparatus for correcting a deflection caused in a cross beam, for use in a cantilever machine tool system, said cross beam extending in a horizontal direction, being supported movably in a vertical direction by a column disposed on a base of the machine tool system, and being coupled with a tool post movable in the horizontal direction, comprising:
    an auxiliary beam extending from an upper portion of the column in the horizontal direction, such that the cross beam is parallel to said auxiliary beam;
    a position detector device for detecting a position of the tool post;
    a first hydraulic cylinder for connecting an end of the cross beam and the auxiliary beam with a variable tension, said first hydraulic cylinder being arranged farther away from the column in the horizontal direction than the tool post;
    a second hydraulic cylinder for connecting the auxiliary beam and the base, said second hydraulic cylinder being closer to the column in the horizontal direction than the tool post;
    a hydraulic pressure controlling device for controlling hydraulic pressures of the first and second hydraulic cylinders;
    a controlling device, using a plurality of predetermined measurement positions at which deflections of the cross beams are to be measured, for respectively measuring the deflections of the cross beam at the plurality of measurement positions, obtaining correction values corresponding to the measurement positions, and storing the correction values, and for controlling the hydraulic pressure controlling device, based on the stored correction values, when the position of the tool post detected by the position detector device corresponds to one of the measurement positions, and based on an interpolation value, when the position of the tool post is between adjacent two of the measurement positions, said interpolation value being determined from a distance between the detected position of the tool post detected by the position detector device and one of the adjacent two measurement positions which is farther away from an end of the cross beam than the other, and from a difference between two of the correction values corresponding to the two adjacent measurement positions, and being an integral multiple of a minimum pressure unit equal to a smallest controllable pressure of the first cylinder.

5. An apparatus for correcting a deflection caused in a cross beam for use in a cantilever machine tool system, according to claim 4, wherein the position signal is input into the controlling device as a digital value corresponding to the position of the tool post detected by the position detector device.

6. An apparatus for correcting a deflection caused in a cross beam for use in a cantilever machine tool system, according to claim 4, wherein the position signal is input into the control device as a clock pulse corresponding to the position of the tool post detected by the position detector device.

* * * * *